A. F. MORRISON.
BALL TAP OR VALVE.
APPLICATION FILED SEPT. 16, 1909.

954,040.

Patented Apr. 5, 1910.

WITNESSES
W. P. Burk
John A. Percival.

INVENTOR
Alexander Finlay Morrison
ATTY

UNITED STATES PATENT OFFICE.

ALEXANDER FINDLAY MORRISON, OF MANCHESTER, ENGLAND.

BALL TAP OR VALVE.

954,040.   Specification of Letters Patent.   Patented Apr. 5, 1910.

Application filed September 16, 1909. Serial No. 518,059.

*To all whom it may concern:*

Be it known that I, ALEXANDER FINDLAY MORRISON, a subject of the King of Great Britain, residing at Hygeia Works, Cornbrook, Manchester, in the county of Lancaster, England, have invented new and useful Improvements in Ball Taps or Valves, of which the following is a specification.

My invention relates to improvements in ball taps or valves and has for its object to provide simple and efficient means for regulating the height or angle of the ball lever relatively to the valve which controls the supply of water to a tank, the adjustment being effected without bending the ball lever by hand in the usual haphazard manner.

Figure 1:
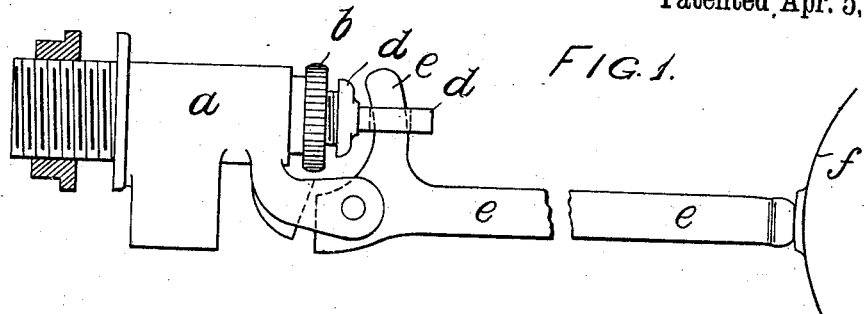
Figure 2:
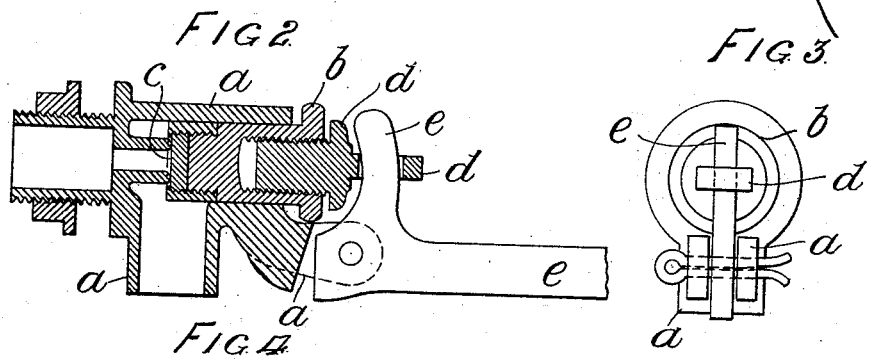
Figure 3:
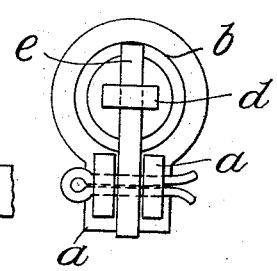
Figure 4:
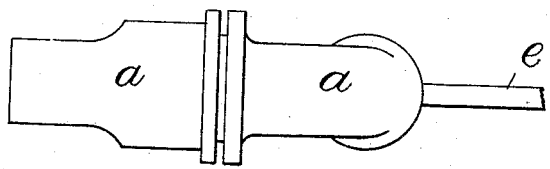

In the accompanying sheet of drawings,— Figure 1 is a side elevation, Fig. 2 a longitudinal section and Fig. 3 an end view of my improved ball tap or valve. Fig. 4 is a plan, Fig. 5 a longitudinal section and Fig. 6 an end view of a modified arrangement of my improved ball tap or valve.

In the drawings, $a$ designates the body or casing of the valve in this case shown provided with a screwed end and nut for securing the valve to a cistern or the like; $b$ the valve consisting of a hollow cylindrical plug, with a solid end, fitted to slide in the body $a$; $c$ a rubber or other valve face secured to the plug; $d$ an eye with a screw threaded shank adapted to screw into the hollow internally threaded end of the cylindrical plug valve; $e$ the float lever pivoted to the body; $f$ part of the ball or float secured to the end of the lever $e$ and shown in Fig. 1 only.

It will be seen that a projection upon the lever $e$ passes through the screwed eye $d$ and by turning the milled head upon the sliding cylindrical plug valve $b$, and so screwing the latter along the shank of the eye $d$, the set or angle of inclination of the lever $e$ relatively to the valve can be adjusted to cause the ball or float $f$ to close the valve sooner or later and according to the depth of water in the cistern.

Figure 5:
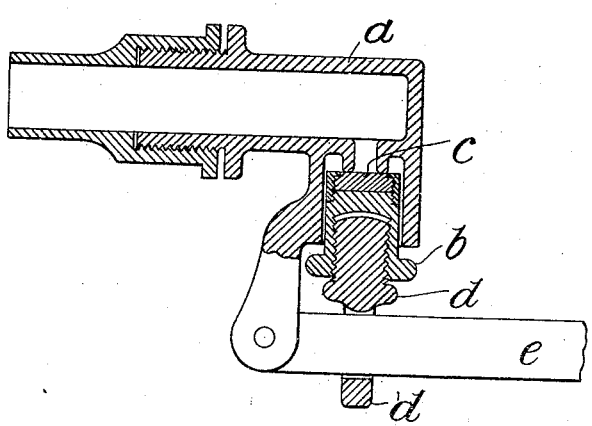
Figure 6:
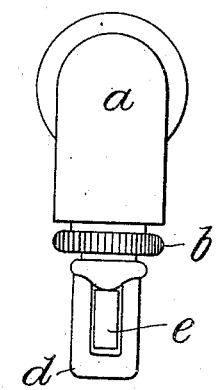

In Figs. 4, 5 and 6 the arrangement is very similar to that shown in Figs. 1, 2 and 3 the only difference being that the cylindrical plug valve $b$ and the screwed eye $d$ are set vertically instead of horizontally, and that the lever $e$ passes directly through the eye $d$.

The supply of water to the cistern is controlled by the ball or float lever $e$, actuating the cylindrical plug valve $b$ in the usual way, and whenever any adjustment of the set or angle of inclination of the lever $e$ is required it can be readily effected by screwing the sliding cylindrical plug valve $b$ upon the screwed shank of the eye $d$, and so regulating the position of the lever $e$ and the ball or float $f$.

I am aware that it has been previously proposed to employ in connection with ball or float valves, a pinching screw or like screw connection for the adjustment of the float lever and I wish it to be clearly understood that I lay no claim to such a device which differs essentially from my arrangement wherein one part of the screw is formed with an eye for connection to the ball lever, and the adjustment is made by screwing the internally threaded cylindrical plug valve upon the screwed eye in order to regulate the set or angle of inclination of the float lever.

I am also aware that it has been previously proposed to employ an adjustable screw plug fitted in a shell working horizontally in the body of the tap; but in such arrangement the shell is formed with lugs on its underside which slide between lugs or flanges forming a slot in the body or valve casing, and the end of the ball lever is rounded and lies in the recess between the lugs on the shell. In this arrangement the shell cannot be turned but it is adjusted by means of an externally threaded plug screwing right through the internally threaded shell, one end of the plug forming the valve and the other end being provided with a winged head and a lock nut to fix the valve in position after adjustment.

In my arrangement the cylindrical plug valve is designed to be and is capable of being screwed upon a screw threaded eye for adjustment. The screwed eye does not pass through the hollow cylindrical valve which has a solid end, and further the screwed eye receives the arm of the lever or the lever itself as the case may be, whereby the cylindrical plug valve is actuated along its central line or axis thus enabling the fulcrum of the lever to be brought much closer to the valve than in the foregoing arrangement.

What I claim as my invention and desire to secure by Letters Patent of the United States is:—

In a ball tap or valve, the combination with a sliding cylindrical internally threaded plug valve with a solid end, of an eye connected to the ball or float lever and having an externally threaded shank screwing into the plug valve and upon which the said valve can be rotated for purposes of adjustment, all arranged and operating substantially as herein set forth.

In testimony whereof I have signed my name to this specification in the presence of two subscribing witnesses.

ALEXANDER FINDLAY MORRISON.

Witnesses:
S. W. GILLETT,
HERBERT ROWLAND ABBEY.